United States Patent [19]
Böttle et al.

[11] Patent Number: 5,822,433
[45] Date of Patent: Oct. 13, 1998

[54] METHOD, SYSTEM AND SUBSCRIBER FACILITY FOR MANIPULATION-PROOF SEPARATION OF MESSAGE STREAMS

[75] Inventors: Dietrich Böttle, Salach; Thomas-Rolf Banniza, Hemmingen, both of Germany

[73] Assignee: Alcatel N.V., Rijswijk, Netherlands

[21] Appl. No.: 635,624

[22] Filed: Apr. 22, 1996

[30] Foreign Application Priority Data

Apr. 28, 1995 [DE] Germany ............... 195 15 681.1

[51] Int. Cl.⁶ ............................................. H04L 9/00
[52] U.S. Cl. ............................ 380/49; 380/9; 380/10; 380/33
[58] Field of Search ............... 380/9, 10, 23, 380/25, 28, 33, 34, 49; 340/825.31, 825.34

[56] References Cited

U.S. PATENT DOCUMENTS

| | | | |
|---|---|---|---|
| 2,586,475 | 2/1952 | Milliquet | 380/33 |
| 4,802,220 | 1/1989 | Marker, Jr. | 380/33 |
| 5,155,466 | 5/1992 | Presttun | 380/9 |
| 5,210,794 | 5/1993 | Brunsgard | 380/9 |
| 5,311,593 | 5/1994 | Carmi | 380/23 |

FOREIGN PATENT DOCUMENTS

| | | |
|---|---|---|
| 0629091 | 12/1994 | European Pat. Off. . |
| 3939828 | 10/1992 | Germany . |
| 4125830 | 1/1993 | Germany . |
| 4026841 | 4/1995 | Germany . |
| 4405038 | 8/1995 | Germany . |
| 9501019 | 1/1995 | WIPO . |

OTHER PUBLICATIONS

"Sichere Kommunikationsnetze und deren Protokolle", M. Leclerc et al, *Informationstechnik* IT32 (1990) 1, pp. 33–45.
"Security Measures in Communication Networks", K. Presttun, *ITT Electrical Communication*, vol. 60, No. 1, 1986, pp. 63–70.

*Primary Examiner*—Bernarr E. Gregory
*Attorney, Agent, or Firm*—Ware, Fressola, Van Der Sluys & Adolphson LLP

[57] ABSTRACT

The present invention concerns a method for the manipulation-proof separation of message streams, which are transmitted in the subscriber loop (3) of a communication network via a medium (30) that is common to several subscribers, where first measures (22, 43) are taken to separate the message streams for transmission via the common medium, which are identical for all message streams, and for connections between at least one subscriber (4) connected to the communication network via the common medium, and another subscriber, supplementary measures (111, 112, ..., 11n; 42) are taken from end to end, which were agreed between these subscribers for these connections, as well as a suitable system and a suitable subscriber facility.

13 Claims, 3 Drawing Sheets

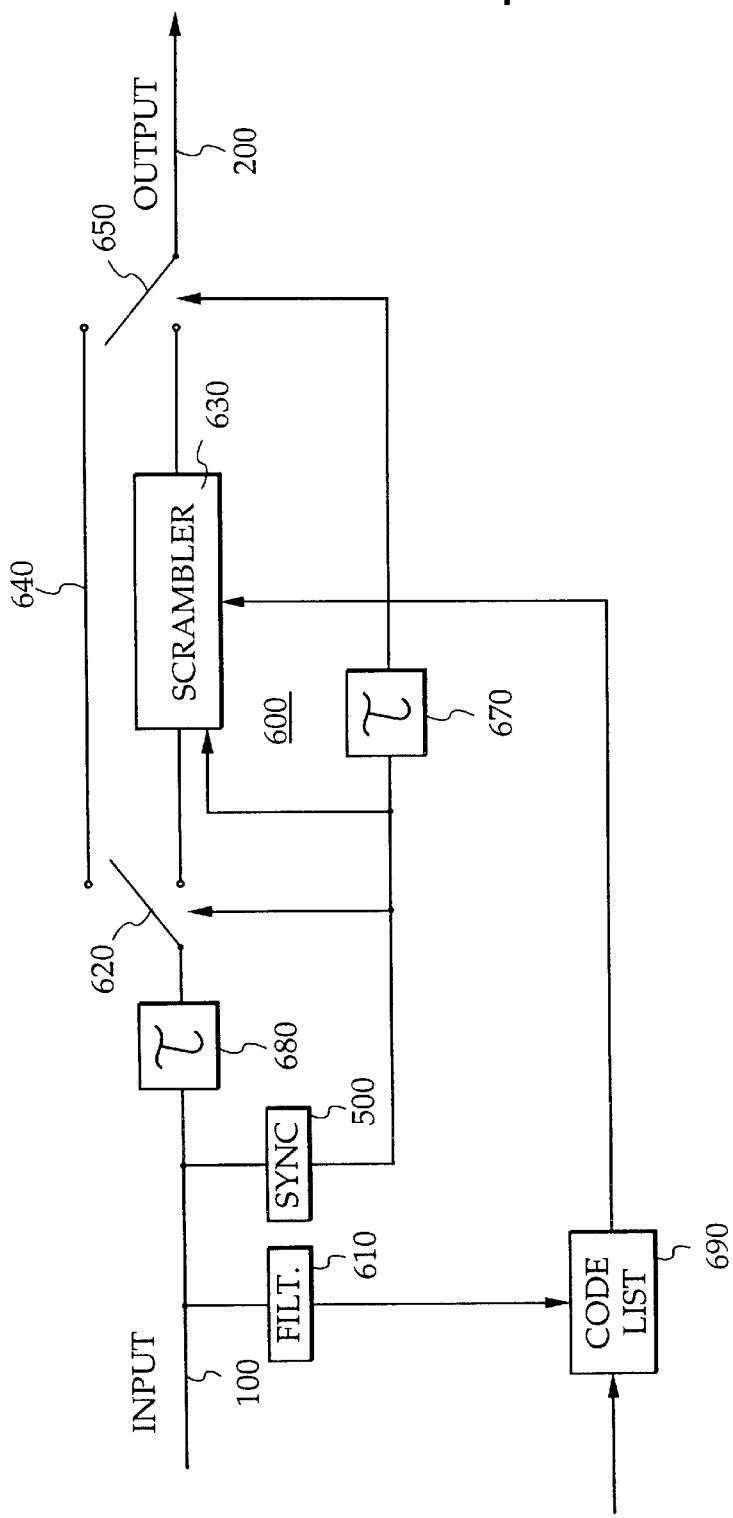

METHOD, SYSTEM AND SUBSCRIBER FACILITY FOR MANIPULATION-PROOF SEPARATION OF MESSAGE STREAMS

TECHNICAL FIELD

The invention concerns a method, a system and a subscriber facility for the manipulation-proof separation of message streams.

BACKGROUND OF THE INVENTION

The transition from the conventional telephone network to the future telecommunications network is subject to the most diverse changes. One of these changes concerns the network structure in the subscriber loop, another the addition of other services, to which the separation of network operator and service provider is linked.

For varied reasons, in the future, a network structure in which several subscribers share a common medium will often be used for the subscriber loop. Examples are both glass fiber or coaxial broad-band connections, as well as a connection via radio. The message streams of many subscribers can thereby also be accessed, at least physically, by the other respective subscribers. However, in addition to the purely physical separation of the message streams, there are other requirements as well. Safety from interception should be mentioned in the first place, for which encryption is used as a rule. But it is also very important to prevent anyone from activating the system of another person, especially at that person's expense. Various authentication concepts are used to that effect. Other requirements must be mentioned here as well, such as e.g. the correct assignment of the fees after verification of the entitlement.

The security measure, which must be assumed to be correct for individual cases, varies from subscriber to subscriber and from service to service. For that reason, the question of whether this security should be provided by the network operator or by the service providers, and where in the network the respective measures should be taken, is presently very relevant.

DISCLOSURE OF INVENTION

According to a first aspect of the present invention, a method for manipulation-proof separation of message streams which are transmitted in the subscriber loop of a communication network over a medium common to a plurality of subscribers, is characterized in that for the transmission over the common medium, first measures to separate message streams are taken which are identical for all message streams, and that for connections between at least one subscriber connected to the communication network over the common medium and a further subscriber, supplementary measures are taken from end to end which were agreed between these subscribers for said connections.

According to a second aspect of the present invention, a system for manipulation-proof separation of message streams which are transmitted in the subscriber loop of a communication network over a medium common to a plurality of subscribers, is characterized in that for the transmission over the common medium, first means for separating message streams are provided which are identical for all message streams, and that for connections between at least one subscriber connected to the communication network over the common medium and a further subscriber, supplementary means are provided at these subscribers for taking measures agreed between these subscribers for said connections.

According to a third aspect of the present invention, a subscriber facility for connecting a subscriber to a communication network via a medium common to a plurality of subscribers in the subscriber loop, said subscriber facility comprising means for manipulation-proof separation of the message streams of said subscriber from message streams of other subscribers, is characterized in that said means execute functions of first means and functions of supplementary means, the functions of the supplementary means having been agreed between said subscriber and a further subscriber for connections between these subscribers.

The solution is very flexible. Neither one-sided optimization of a certain service, e.g. "video-on-demand" or "telephony", nor an extreme worst-case design are required. An organizational layout is also provided, for example with code management and authentication.

A few points of view will be mentioned as examples at first, which could be important for the design of individual cases:

With telephony, simple encryption and authentication measures by the network operator are usually sufficient. As a rule, a telephone call is relatively short, so that even a simple code can only be deciphered with great effort, which would not be worthwhile because of the normally low degree of confidentiality. Even an accidental wrong or missing assignment of the fees at a low fee level could be accepted, if any repetition is at least prevented. For higher fees, a follow-up authentication at a higher security level could be provided during the call, as is already the case with credit card calls, for example. If the network operator does not provide "Telephone" service, the follow-up authentication can be performed by the service provider. The network operator can change the code during longer calls. A separate service can be offered for calls with a higher degree of confidentiality, where the applicable service providers add another code (and their own authentication) to the code provided by the network operator. A high degree of security can even be achieved with two simple but reciprocally independent codes.

There will also be service providers who offer some services like pages in a mail order catalog, free of charge and for everyone, as an introduction to the actually wanted sales business. Security of any kind is therefore not necessary from the view point of these service providers. However, the customer could be interested in remaining anonymous. Otherwise there could be the possibility, for example, to obtain address lists for targeted advertising or targeted requests for donations by means of automated interception and evaluation.

If a subscriber now goes from the pages in a mail order catalog to the actual ordering, the question of authentication comes to the foreground.

For pay-TV, perhaps also for video-on-demand, the information must above all be encrypted with a code, which is difficult to decipher, even over an extended time. The cited examples, which can be expanded or combined in any manner, show that a somewhat higher cost could be charged, at least to the subscriber.

At least the subscriber facilities which can be used for several services, whether they are the terminals themselves or a network termination installation for example, must also be adaptable to these services. First means, which are identical for all message streams and guarantee basic security, must be available to fulfill those functions at the network operator level. Variations which are conditioned by the respective transmission capacity for example, are not considered any further in this instance. In addition to these first means, supplementary means must be available to fulfill different functions at the service level. If different services are used, or the same service is used from different service providers, the functions of the supplementary means must be deactivatable or switch-selectable.

The functions that are performed at the service level must be agreed between the respective subscribers, because they operate from end to end. This takes place as a rule by agreement with the respective service provider, who is often himself one of the two subscribers. Changing this agreement (e.g. code changes) can be a part of this function.

To keep the cost of the subscriber facility low, the means and measures of the network operator can be synchronized with those of a service provider. It is then possible to form a combined code in the subscriber facility e.g., and to encrypt and decrypt by means of this combined code at the network level and at the service level as well. The same applies to authentication.

These and other objects, features and advantages of the present invention will become more apparent in light of the detailed description of a best mode embodiment thereof, as illustrated in the accompanying drawing.

BRIEF DESCRIPTION OF THE DRAWING

FIG. 3 illustrates a second configuration example of an encrypter for ATM message streams as a means to separate message streams in a manipulation-proof manner according to the invention.

FIG. 4 illustrates a configuration example of a decrypter for ATM message streams as a means to separate message streams in a manipulation-proof manner according to the invention.

BEST MODE FOR CARRYING OUT THE INVENTION

Figure 1:
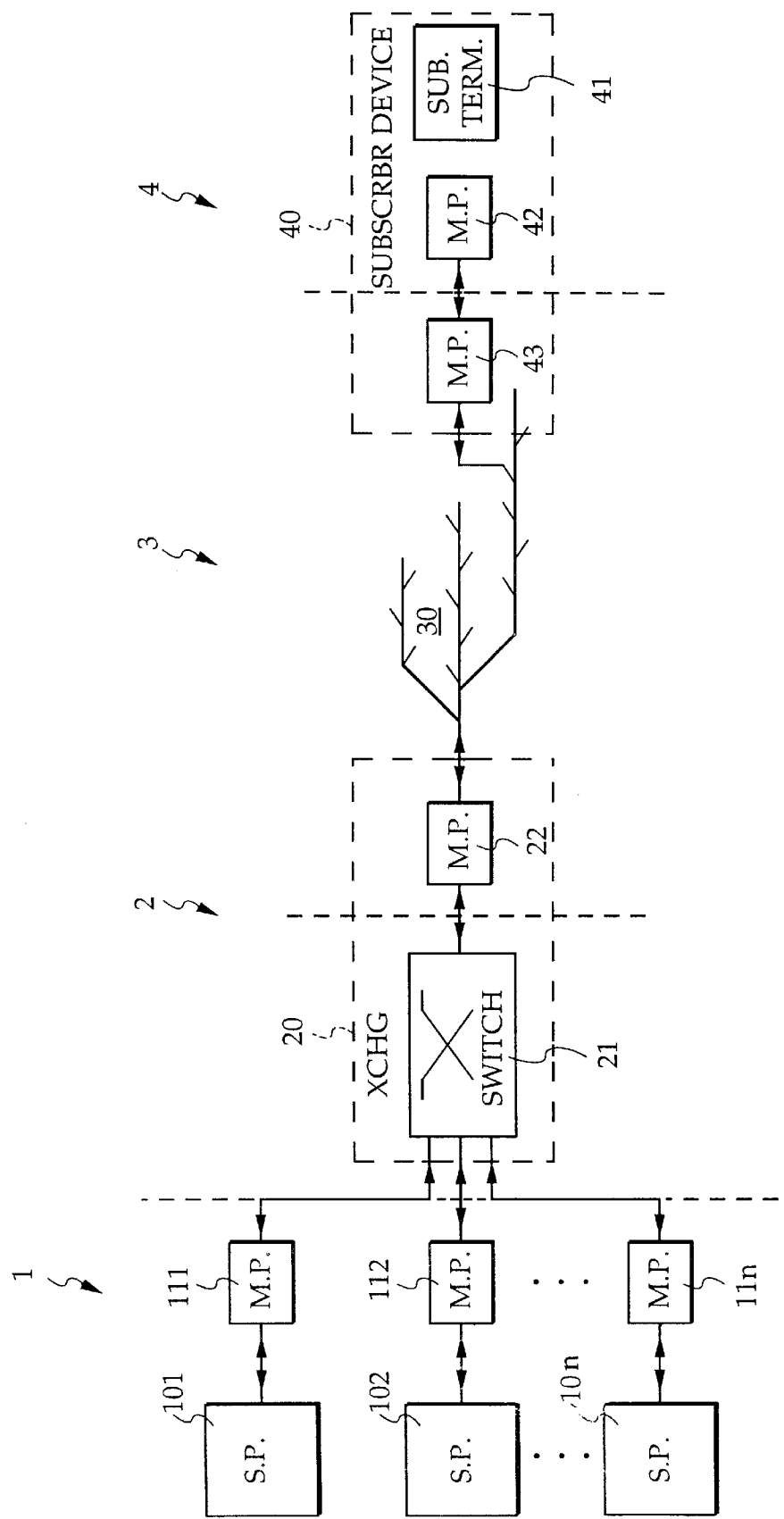
FIG. 1 illustrates a configuration example of a system according to the invention, with a subscriber facility according to the invention, for carrying out a method according to the invention, for the manipulation-proof separation of message streams.

FIG. 1 differentiates between four areas, a service provider area 1, a network area 2, a subscriber loop 3 and a subscriber area 4.

The service provider area 1 illustrates the devices of three service providers, others are indicated by dots.

Here the devices of each service provider are separated into two parts, namely one unit identified here as service provider unit 101, 102, ..., 10n, and another unit identified here as manipulation-proof unit 111, 112, ..., 11n on the service provider side. Each service provider unit is connected to the network area 2 through the assigned manipulation-proof unit.

A switching device 21 is illustrated instead in the network area 2. This should rather be taken as symbolic. The service providers, which in this instance also represent other subscribers, must not be connected to the same exchange as the subscriber loop 3 under consideration here. Nor should all the service providers be connected to the same exchange. Nor is it required for the service providers to be connected by an exchange to the same network operator, which operates the subscriber loop 3 considered here.

In this instance, the switching device 21 and a network-side manipulation-proof unit 22 are combined into an exchange 20.

The manipulation-proof unit 22 is spatially and organizationally arranged in the exchange 20, but actually belongs to the subscriber loop 3, which is represented here by a broad-band distribution network 30 with a tree structure, and by a network-termination manipulation-proof unit 43 on the subscriber side. The subscriber loop 3 also comprises other subscriber devices, which are not considered here in detail. They can be connected in the same manner; they can be connected through distribution networks of a different structure, or by single lines.

A subscriber terminal 41 and a service-termination manipulation-proof unit 42 on the subscriber side are illustrated in the subscriber area 4. They are combined into a subscriber device 40, together with the network-termination manipulation-proof unit 43 on the subscriber side, which belongs to the subscriber loop 3.

The network-termination manipulation-proof unit 43 on the subscriber side, together with several similar units from other subscribers, is the counterpart of the manipulation-proof unit 22 on the network side. The manipulation-proof unit 22 on the network side must therefore fulfill the respective functions for all of these subscribers, preferably in the time multiplex mode. But it can also be imagined, for example, that the authentication of all subscribers takes place in the time multiplex mode with one and the same arrangement, while the decryption and encryption are achieved for each individual subscriber with several arrangements operating in parallel.

The same applies respectively to the network-termination manipulation-proof units 42 on the subscriber side, and the manipulation-proof units 111, 112, ..., 11n on the service provider side. It should also be said, however, that the functions to be fulfilled for the manipulation-proof security can differ from network provider to network provider. It could possibly therefore not be enough to change a data set, especially a code key, on the subscriber side. Switching between different devices must then possibly take place, for example by changing an intelligent chip-card. These functions can also be unnecessary for individual services, perhaps telephony, and the device 42 can therefore be deactivatable. On the other hand, individual services on the service provider side can possibly be simplified considerably. For example, a pay-TV provider can omit authentication altogether, and encrypt all subscribers with the same code.

Synchronizing one of the manipulation-proof units 111, 112, ..., 11n on the service provider side with the manipulation-proof unit 22 on the network side, can achieve a combination of the network-termination manipulation-proof unit 43 on the subscriber side with the service-termination manipulation-proof unit 42 on the subscriber side. However, since there are several subscriber loops in the total network, the synchronization of all manipulation-proof units on the network side would then be required.

It should be understood that the present invention also covers individual service providers with pure distribution services that can supply the subscriber loop 3 directly and bypass the network area 2. In such cases, the network-termination manipulation-proof unit 43 on the subscriber side would then be shunted or absent.

Finally some examples of encrypters and decrypters of ATM data streams will be described:

As a rule, an ATM data stream contains cells (data packets), belonging to different message streams. If the entire data stream is to be transmitted in encrypted form, for example during a directional radio link, this can be achieved with conventional methods. By contrast, if the entire data stream in a distribution network is accessible to a number of subscribers for example, each of which can access the message stream that concerns him, each of these message streams must be transmitted separately and encrypted with its own code. The respective key can then be obtained from the unencrypted packet head. Of course, message streams that concern everyone could also be embedded in such a data stream, for example for radio or television, or which do not require confidentiality for other reasons. These can also remain unencrypted.

The known methods for continuous or for self-contained messages can be used to encrypt the message parts that follow the packet heads.

A known possibility of encrypting is block coding, whereby the data to be encrypted are divided into blocks, and each block is copied separately, as a whole, to another block by means of an imaging specification. A particularly simple partition results if each message portion that follows a packet head is treated like such a block, and if the imaging specification is designed so that a block has the same length before and after the imaging.

With block encoding, the security against unauthorized decrypting depends on the length and the number of encrypted blocks being transmitted. In the present case, the length of the blocks is predetermined. One of the applications presently being investigated is pay-TV television, where the length of the transmission is equal to the validity time of the subscription, and the number of transmitted blocks can be any at all. In addition, the appeal of unauthorized decrypting is very high, particularly in this case. One possibility of help is frequent code changing, in other words changing the imaging specification. How this can take place in a secure manner is not covered by this invention.

Another possibility is the use of longer codes. In that case block-coding is no longer applicable, but current-coding is. A continuous data stream is treated with an algorithm in such a way, that a new data stream results, in which consecutive bits of one data stream also correspond to consecutive bits of another data stream. A simple example is to link both the data stream to be encrypted and the data stream to be decrypted by an exclusive OR function with a bit sequence that serves as the key. A "1" in the code leaves the corresponding bit of the data stream unchanged, by contrast a "0" inverts it. The result of the double consecutive inversion, as well as the double unchanged continuation, is the original unencrypted bit sequence. The code can be of any length and thus as secure as desired. But this makes the manipulation more difficult. Not too long a code, which is occasionally changed, would be suitable in this case.

With this type of encryption, whereby a message part following a packet head is encrypted or decrypted beyond its borders, the encryption or decryption process must be interrupted at the end of a message part, until the beginning of the next message part belonging to the same connection has appeared.

This also produces the problem of synchronizing the encryption and decryption processes with each other, above all checking the synchronization during a transmission. There are applications wherein the packets of a connection in the packet head are numbered sequentially. This numeration can possibly be used to synchronize the encryption and the decryption.

If no such numbering is available, or is not suitable for synchronization, appropriate synchronizing words are inserted into the data stream being encrypted.

The synchronizing words serving to synchronize the decryption must be able to be recognized before the decryption, because they are a premise of the decryption. They must therefore not be encrypted as well. Even sequential numbers, serving to number the packets, must possibly be exempted from the encryption, if they are accessed during the transmission. The same applies to all other parts of the message, which are used to secure the transmission in any way. They are assigned to the packet head at the end.

Figure 2:
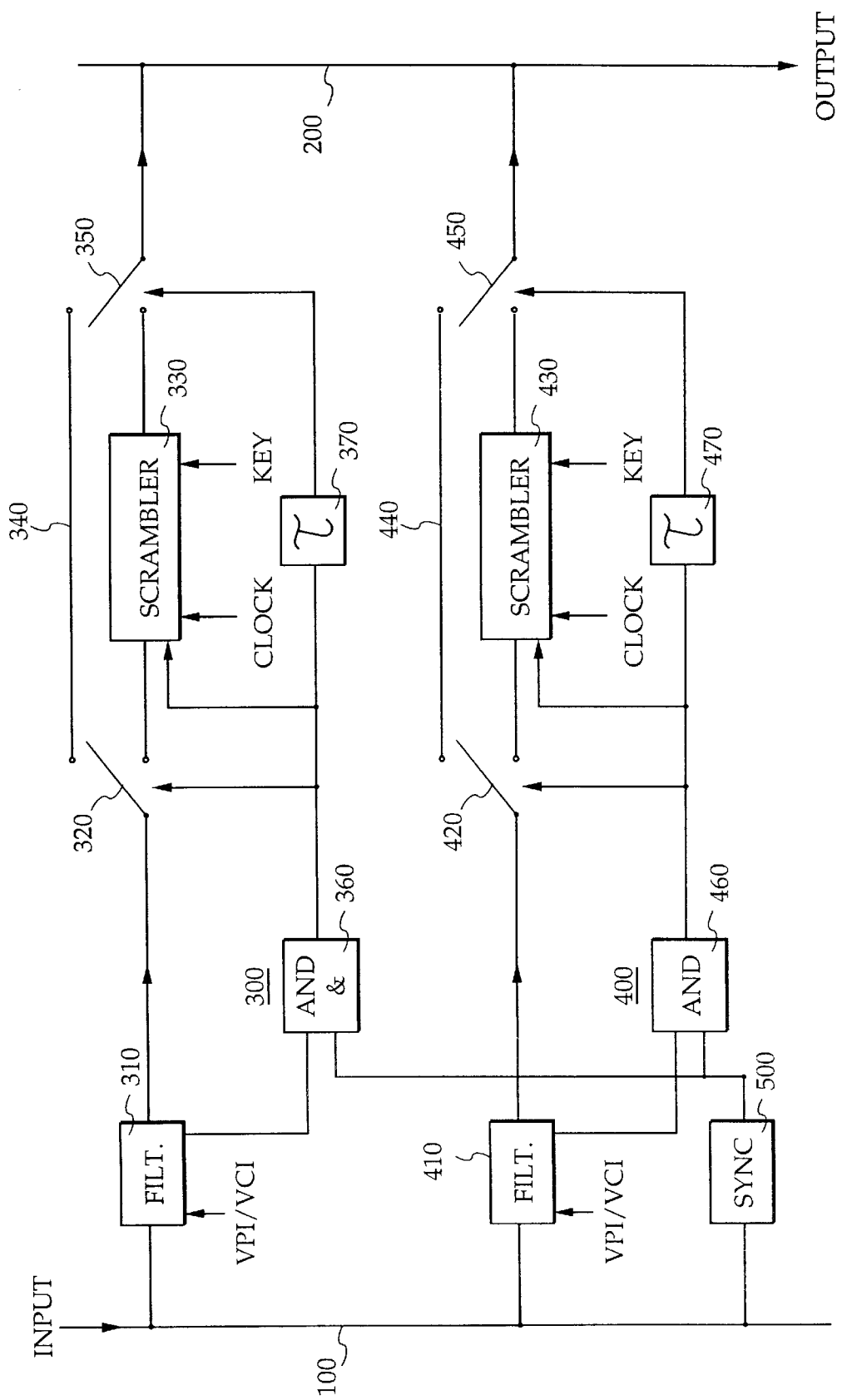
FIG. 2 illustrates a first configuration example of an encrypter for ATM message streams as a means to separate message streams in a manipulation-proof manner according to the invention.

The encrypter in FIG. 2 comprises an input line 100, an output line 200, a first and a second encryption part 300 or 400, and a synchronization part 500.

The two encryption parts have the same construction. Each encryption part is provided for encrypting one message stream. The number of exactly two encryption parts is therefore only symbolic. As a rule, several encryption parts are provided. However, encrypters with only one encryption part could be useful.

Each encryption part comprises a filter 310 or 410, a first selector switch 320 or 420, a scrambler 330 or 430, a phasing line 340 or 440, a second selector switch 350 or 450, an AND gate 360 or 460, and a delay element 370 or 470.

The data stream arriving via input line 100 is routed to the filters 310 and 410 and to the synchronization part 500. Each filter is assigned the identification of a message stream. In this case it is named VPI/VCI and identifies the virtual path and the virtual channel assigned to this message stream. Each filter only allows the packets of the pertinent message stream to pass, and simultaneously informs the pertinent AND gate of this.

The synchronization part 500 derives a mask from the incoming data stream, which masks those parts of the data stream that can be encrypted, against the others. This mask is offered to all encryption parts via their AND gate. Whether anything is actually encrypted depends on whether the respective filter even allows a message to pass.

The output of the AND gate 360 switches the first selector switch 320, activates the scrambler 330 and switches the second selector switch 350 via the delay element 370. In addition, a clock pulse and a code key are supplied to the scrambler 330. The parts of the message stream to be encrypted are supplied to the output line 200 via the selector switch 320, the scrambler 330 and the selector switch 350. The parts not being encrypted bypass the scrambler through both selector switches 320 and 350 and the phasing line 340.

The second encryption part 400 operates in the same way, as would any potential other. The respective identification VPI/VCI and the respective code are adjusted during the course of establishing a connection. The code key can be changed during the connection. The adjustment of identification and code key, and a possible code change, take place like the adjustment and change of other parameters of a connection. This is not covered by the present invention. Unchangeable and fixed parameters can be used in certain cases.

The use of a scrambler is only given as an example here. Any device comprising a suitable encryption mechanism can be used in this case. The delay time of the delay element 370, as well as the delay time of the phasing line 340, must be adapted to the scrambler's processing time.

Insofar as the code being used and the packet beginnings are not synchronized with each other, an additional suitable synchronization must take place in the scrambler. How much the synchronization part affects the scrambler depends on the respective type of encryption being used. This is not specified by the invention.

If further data packets are contained in the data stream in input line 100, perhaps control packets or blank packets, they must be switched by another filter to the output line 200, with the corresponding delay time.

The encrypter in FIG. 3 is similar in construction to the one in FIG. 2. In this instance, an encryption part 600 and the synchronization part 500 are located between input line 100 and output line 200.

In this example the encryption part 600 comprises another delay element 680 and a code list 690, in addition to a filter 610, a first selector switch 620, a scrambler 630, a phasing line 640, a second selector switch 650 and a delay element 670.

Most of the construction and operation is the same as in the preceding example. However, in this case an encryption part for the encryption of several message streams is used in the time multiplex mode.

The filter 610 filters as many packet heads from the data stream as are needed to determine the respectively required code. But the packet heads also continue in the normal data stream. The information filtered from of the packet heads serves to address the code list 690, which respectively delivers the correct code to the scrambler 630. Insertion of the codes into the code list takes place in accordance with known methods, depending on the adjustment type of a connection parameter. A code, which does not change the message in the scrambler, may be inserted for control and blank packets, as well as for not to be encrypted message streams.

The other delay element 680 balances the delay time of the filter and the AND gate with respect to the example in FIG. 2.

The decrypter 700 in FIG. 4 comprises an input line 720, a filter 710, a descrambler 730, an output line 740 and a synchronization part 500.

The filter 710 extracts a single message stream from the data stream in input line 720 and directs it to the descrambler 730, which cancels the effect of the pertinent scrambler by means of the same code key.

It was assumed in the illustrated example that only the pure message stream is required at the output of the encrypter. For that reason, the filter 710 only allows the message parts of the selected packets to pass in this instance. Bypassing the packet heads around the descrambler is therefore not required. In this case the synchronization part 500 is used exclusively for synchronizing, and not for masking as well. Conversion of the extracted message parts into a continuous data stream is not described here any further.

In regard to other measures for the manipulation-proof separation of data streams, no peculiarities need to be considered, especially with respect to authentication, if ATM is used as the transmission mode.

We claim:

1. A method for manipulation-proof separation of message streams which are transmitted in a communication network over a medium common to a plurality of subscribers, comprising the steps of:
    taking selected first security measures to separate message streams which first security measures are identical in kind and taken for all the separate message streams, and that for connections between at least one subscriber connected to the communication network over the common medium and a further subscriber,
    taking preselected supplementary security measures for said at least one subscriber and for said further subscriber connected to said medium via said network.

2. A method as claimed in claim 1, characterized in that the first means for providing said first security measures are authentication measures.

3. A method as claimed in claim 1, characterized in that the first means for providing said first security measures are encryption and decryption measures.

4. A method as claimed in claim 3, characterized in that the first means for providing said first security measures and the second means for providing said supplementary security measures are synchronized.

5. A system for manipulation-proof separation of message streams which are transmitted in a subscriber loop of a communication network over a medium common to a plurality of subscribers, comprising:
    first security means for Providing first security measures including plural identical separation means for separating corresponding plural message streams, and for at least one connection between at least one subscriber connected to the communication network over the common medium and a further subscriber, and
    supplementary security means for providing supplementary security measures at these subscribers for taking additional preselected measures between subscribers for said at least one connection.

6. A system as claimed in claim 5, characterized in that the first means for providing said first security measures includes means for providing authentication measures.

7. A system as claimed in claim 5, characterized in that the first means for providing said first security measures are means for providing encryption and decryption measures.

8. A subscriber facility for connecting a subscriber to a communication network via a medium common to a plurality of subscribers, said subscriber facility comprising means for manipulation-proof separation of a message stream of said subscriber from message streams of other subscribers, characterized in that said means include first means for providing first security measures for executing said manipulation-proof separation and second means for providing supplementary security measures, for executing preselected security measures for a connection between said subscriber and a further subscriber connected to said medium via said network.

9. A subscriber facility as claimed in claim 8, characterized in that functions of the first means for providing said first security measures and of the second means for providing said supplementary security measures are executed together.

10. A subscriber facility as claimed in claim 9, characterized in that functions of the second means for providing supplementary security measures are deactivatable or switch-selectable.

11. A subscriber facility as claimed in claim 8, characterized in that functions of the second means for providing said supplementary security measures are deactivatable or switch-selectable.

12. A subscriber facility as claimed in claim 8, characterized in that the first means for providing said first security measures include means for providing authentication measures.

13. A subscriber facility as claimed in claim 8, characterized in that the first means for providing said first security measures include means for providing encryption and decryption measures.

* * * * *

UNITED STATES PATENT AND TRADEMARK OFFICE
CERTIFICATE OF CORRECTION

PATENT NO. : 5,822,433
DATED : October 13, 1998
INVENTOR(S) : Bottle et al.

It is certified that error appears in the above-identified patent and that said Letters Patent is hereby corrected as shown below:

Column 8, line 17 (claim 5, line 5) "Providing" should read --providing--.

Signed and Sealed this

Nineteenth Day of January, 1999

Attest:

Attesting Officer

Acting Commissioner of Patents and Trademarks